United States Patent [19]

Gillem

[11] Patent Number: 5,029,933
[45] Date of Patent: Jul. 9, 1991

[54] CAR COVER

[76] Inventor: Vernon A. Gillem, Rte. 1, Piedmont, S.C. 29673

[21] Appl. No.: 441,245

[22] Filed: Nov. 27, 1989

[51] Int. Cl.5 .............................................. B60J 11/00
[52] U.S. Cl. .................................. 296/136; 296/95.1; 150/166; 160/370.2
[58] Field of Search ..................... 296/136, 98, 95.1; 150/166; 160/370.2

[56] References Cited

U.S. PATENT DOCUMENTS

| 2,801,667 | 8/1957 | Curran | 296/136 X |
| 3,021,894 | 2/1962 | La Due | 296/98 X |
| 4,209,197 | 6/1980 | Fischer | 296/136 X |
| 4,657,298 | 4/1987 | Yong O | 296/136 |
| 4,718,711 | 1/1988 | Rabbit | 296/136 |
| 4,727,898 | 3/1988 | Guma | 296/136 X |
| 4,732,615 | 3/1988 | Kawashita et al. | 106/22 |
| 4,746,162 | 5/1988 | Maness | 296/97.2 X |
| 4,821,785 | 4/1989 | Rolan | 296/136 X |
| 4,842,324 | 6/1989 | Carden | 296/136 |

FOREIGN PATENT DOCUMENTS

| 3130531 | 6/1982 | Fed. Rep. of Germany | 296/136 |
| 1316397 | 12/1963 | France | 296/136 |
| 1522367 | 8/1978 | United Kingdom | 296/136 |

Primary Examiner—Margaret A. Focarino
Assistant Examiner—Joseph D. Pape
Attorney, Agent, or Firm—Cort Flint

[57] ABSTRACT

A cover (A) for slowing or reducing the rate of heat build-up in an interior compartment (19) of a vehicle (10) is disclosed. The cover includes a main panel (12) having a rear window panel (14), a roof panel (16), and a front window panel (18) which generally cover the respective portions of the vehicle (10). Auxiliary side panels (20, 22) cover side windows of the vehicle. Front strap (26) envelopes the front end of the car. Rear securing straps (32) secure main panel (12) to the interior of the trunk compartment so that the cover cannot be removed when installed over the vehicle unless it is cut off providing an anti-theft feature. Preferably, the cover is a nonwoven web (44) having a soft nonwoven side (46) and a vinyl cover exterior side (48).

3 Claims, 2 Drawing Sheets

CAR COVER

BACKGROUND OF THE INVENTION

The invention relates to a protective car cover for cooling the interior of an automobile and the like vehicle while parked.

In the past, covers have been proposed which simulate a car port such as disclosed in U.S. Pat. Nos. 4,718,711 and 4,657,298. These devices are of the nature of a portable car port which is wound on a roller contained in the trunk of the vehicle. While this construction may be suitable for this purpose, the retraction mechanism renders the device rather complicated and limits the cover to a generally uniform shape which can be retracted easily.

More simple devices have been proposed, for example, in U.S. Pat. Nos. 2,803,282; 2,950,749; 280,667; and 2,716,433, all of which disclose automobile covers and curtains using various arrangements of straps for securing the device over at least the passenger compartment portion of the vehicle. Many of these devices are directed mainly to protecting the body of the vehicle, rather than maintaining the interior of the vehicle cool during temporary parking of the vehicle in the hot sun. The problem occurs that the devices are too cumbersome to easily provide a simple device which may be readily stored in a convenient location of the vehicle, and may be readily removed from storage and secured over the passenger compartment interior of the vehicle to maintain the interior cool and protect the dash, steering wheel, and other interior surfaces from extreme heat, and possible harmful effects of the sun.

Accordingly, an object of the invention is to provide a car cover which may be readily placed over the passenger compartment interior of a vehicle to protect the interior from the sun and maintain it cool.

Another object of the invention is to provide a car cover which may be semi-attached to the vehicle to prevent theft, but yet may be easily installed and stored.

Another object of the invention is to provide a car cover which is light weight, may be readily placed over the passenger compartment of an automobile and the like, will not mar the finish of the automobile, maintains the interior cool, and blocks the harmful rays of the sun which may degrade the interior structures of the compartment.

Another object of the invention is to provide a cool car cover which may be readily installed over the passenger compartment of an automobile and the like when parked and then stored for travel.

SUMMARY OF THE INVENTION

The above objectives are accomplished according to the present invention by providing a car cover for reducing or slowing the rate of heat build-up in an interior of a vehicle made from a light weight material which has a soft underside to prevent marring of the automobile finish and a water repellent exterior side. Preferably, a material made from a nonwoven web is utilized having a soft interior side and a vinyl covered exterior side. The cover is treated with an ultraviolet blocker to block the sun rays to reduce or slow the rate of heat build-up in the automobile interior and protect the steering wheel, dash, and other like components from the rays. The cover includes a main panel which generally covers the back window, roof, and front window of the automobile; and two auxiliary side panels which cover the side windows of the automobile. The cover may be advantageously stored in the trunk with two rear tie straps attached to the hinges of the trunk lid. The cover may be removed from the trunk with the trunk lid raised and stretched over the top of the automobile with straps attached. The trunk may be shut with the cover inaccessibly attached inside the trunk. Elastic shock cords are attached to the front of the cover and to the front of the vehicle, while the side panels may be similarly attached to side mirrors, door handles, etc. To remove the cover, the trunk lid again is raised, straps are removed, and the cover is dropped into the trunk remaining attached to the trunk lid hinges.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF THE PREFERRED EMBODIMENT

Figure 1:
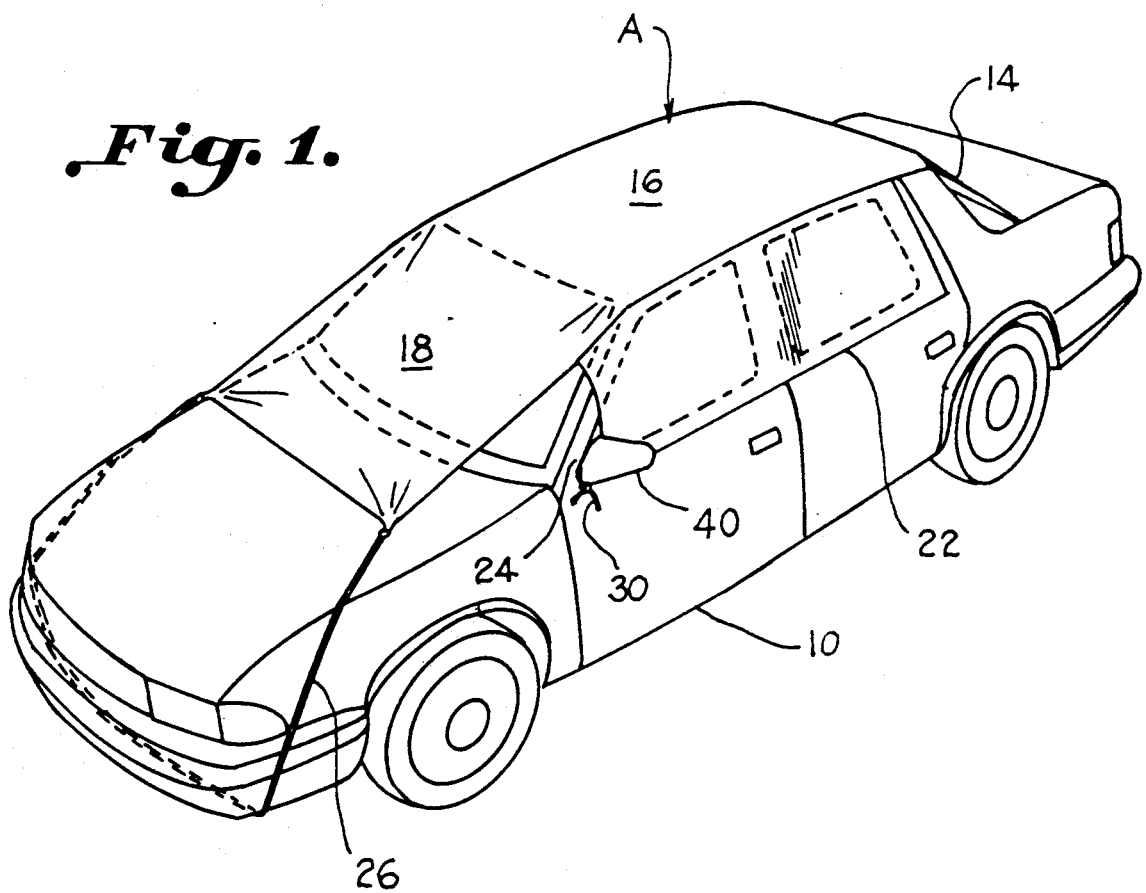
FIG. 1 is a front perspective view illustrating a car cover for cooling the interior of a vehicle constructed according to the present invention.
Figure 2:
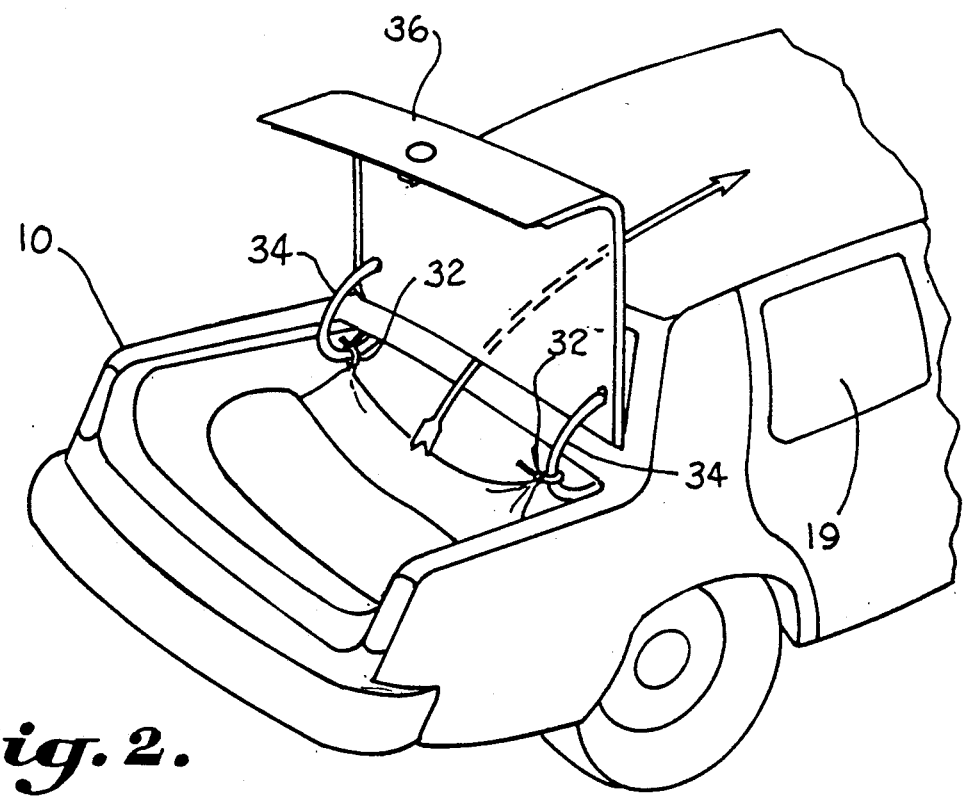
FIG. 2 is a partial rear perspective view illustrating a car cover for cooling the interior of a vehicle constructed according to the present invention.
Figure 3:
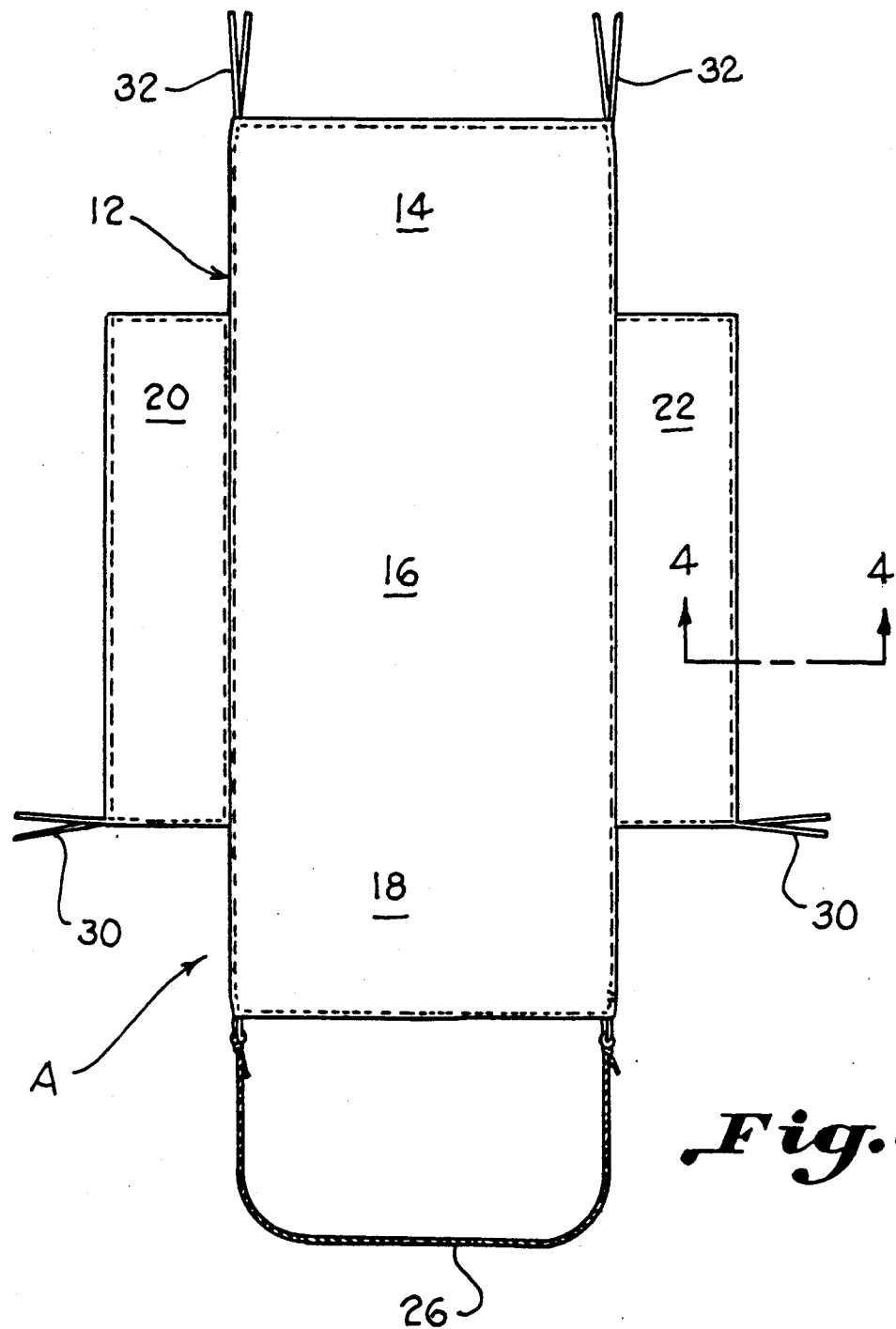
FIG. 3 is a top plan view of a car cover for cooling the interior of a car type vehicle according to the invention.

Referring now in more detail to the drawings, a car cover, designated generally as A, is disclosed for reducing or slowing the rate of heat build-up in the interior of a car 10 while parked in the sun. Cover A includes a main panel 12 which includes a rear window panel 14, a roof panel 16, and a front window panel 18 which generally cover the respective portions of the vehicle and block the sun from a passenger compartment interior 19 of car 10. As can be seen in FIG. 1, rear window panel 14 and front window panel 18 do not lie flush against the rear and front windows respectively. Each of the panels 14 and 18 are tied down so that their edge portions contact the car body a spaced distance from the windows so as to create an air space between the windows and the cover. This arrangement further enhances cooling or the slowing of heat build-up. There is a first side panel 20 which covers the side windows on a first side of the car, and a second side panel 22 which covers the windows on a second side 24 of the car. Attachment means for securing the cover to the vehicle includes elastic cord means 26 for securing front window panel 18 to the front of the vehicle, side straps 30 for securing the side panel to the vehicle, and rear straps 32 for securing rear window panel 14 within the trunk. Elastic cord means 26 preferably includes a loop of elastic, such as an elastic shock cord, which encircles the front end of vehicle 10, as can best be seen in FIG. 1. This is quick and an expedient to modern cars which lack attachment elements at the front end. Straps 32 are tied to the hinges 34 of the trunk lid 36, or other areas of the trunk which are not accessible when trunk lid 36 is closed. Cover A is passed through the opening created by the upper end of the trunk lid and the upper edge of the car body forming the opening for the trunk area. The trunk lid 36 is then closed to secure, along with straps 36, panel 14 in position. This provides an anti-theft means which affords some degree of deterrence against theft of cover A. When cover A is installed over the vehicle, and the trunk lid closed, it must be cut off if it is stolen. This takes an overt action of thievery. Otherwise, if the cover could be removed by untying from outside the vehicle, the act may not be suspect. With the straps secured within the trunk, the front elastic straps may be stretched to hold the cover in place in a quick and convenient manner. Side straps may be attached to side mirrors 40, handles of the doors, or other suitable structure.

Figure 4:
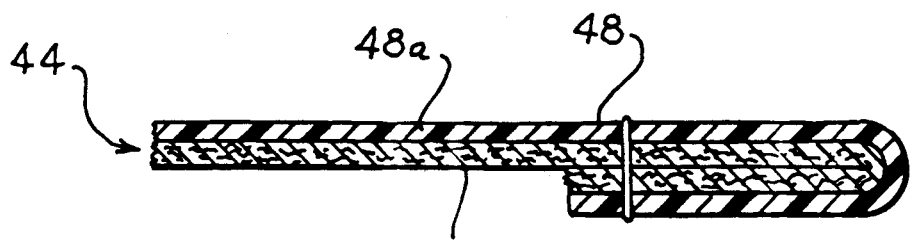
FIG. 4 is a sectional view taken along line 4—4 of FIG. 3.

Preferably, cover A is constructed from a nonwoven web 44, as can best be seen in FIG. 4, making it very light and convenient to install over the automobile. The nonwoven web has a soft interior side 46 and a waterproof exterior side 48 having a vinyl or other waterproof covering or coating 48a. Soft interior side 46 consists of a soft nonwoven web of cotton, or synthetic fiber such as polyester, having a non-marring finish, and exterior side 48 consists of the same plus the waterproof coating. One suitable fabric is manufactured by the Twitchell Corporation of Dothan, Ala., under the designation of "DUON". Finally, the material is treated with an ultraviolet blocker to further prevent the passage of the sun's rays, maintain the interior of the vehicle cool, and reduce the harmful effect of solar rays on the interior while parked in the sun.

While a preferred embodiment of the invention has been described using specific terms, such description is for illustrative purposes only, and it is to be understood that changes and variations may be made without departing from the spirit or scope of the following claims.

What is claimed is:

1. A car cover for slowing the rate of heat build-up in an interior compartment of a vehicle having a front window, a rear window, side windows on first and second vehicle sides, and a rear compartment having a trunk lid pivotally mounted adjacent one end on hinge members to be raisable, said cover consisting of:

a main panel which includes a front window panel, a roof panel, and a rear window panel extending generally over said rear window, roof, and front window of said vehicle;

auxiliary side panels carried by said main panel extending generally over said side windows of said first and second vehicle sides;

said rear window panel including a rear edge, and said front window panel including a front edge, a first edge extending between said rear and front edge, a second edge extending between said rear and front edge, and auxiliary side panels carried by said main panel extending from said first and second edges;

strap means having a first end attached directly to said rear edge of said rear window panel, and a second end removably attachable to said hinge members inside an interior of said compartment of said vehicle so that said cover may be unremovably secured to said vehicle when installed to extend from inside trunk adjacent said one end of said lid over and spaced from said rear window, roof, front window, and side windows of said vehicle;

said front securing means consisting of a closed elastic loop, carried by said front edge of said front window panel, said front securing means being configured to encircle a front end portion of said vehicle and to continuously exert a forward pull on said main panel whereby said cover is continuously held in a taught condition, and said front window panel is held in a position spaced from said front window; and said cover consists of light weight material having a soft interior side consisting of a non-woven web which prevents scratching of the surface of said vehicle, and an exterior side which includes a waterproof coating carried on said non-woven web.

2. The cover of claim 1 wherein said waterproof coating comprises a vinyl covering.

3. The cover of claim 1 wherein said cover includes an ultraviolet blocking agent added to said material to prevent passage of ultraviolet rays through said cover.

* * * * *